(12) United States Patent
Ford et al.

(10) Patent No.: US 9,965,628 B2
(45) Date of Patent: May 8, 2018

(54) DEVICE REPORTING AND PROTECTION SYSTEMS AND METHODS USING A SECURE DISTRIBUTED TRANSACTIONAL LEDGER

(71) Applicant: DELL PRODUCTS L.P., Round Rock, TX (US)

(72) Inventors: Daniel A. Ford, Mount Kisco, NY (US); YuLing Chen, Fremont, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 14 days.

(21) Appl. No.: 14/702,321

(22) Filed: May 1, 2015

(65) Prior Publication Data
US 2016/0259937 A1   Sep. 8, 2016

Related U.S. Application Data

(63) Continuation-in-part of application No. 14/635,577, filed on Mar. 2, 2015.

(51) Int. Cl.
| | |
|---|---|
| H04L 29/08 | (2006.01) |
| G06F 21/55 | (2013.01) |
| G06F 21/57 | (2013.01) |
| G06F 21/88 | (2013.01) |
| G06F 21/64 | (2013.01) |
| H04L 9/32 | (2006.01) |

(52) U.S. Cl.
CPC ............ *G06F 21/554* (2013.01); *G06F 21/57* (2013.01); *G06F 21/577* (2013.01); *G06F 21/64* (2013.01); *G06F 21/88* (2013.01); *H04L 9/3236* (2013.01); *G06F 2221/2111* (2013.01); *G06F 2221/2143* (2013.01); *H04L 67/1046* (2013.01); *H04L 2209/38* (2013.01); *H04L 2209/56* (2013.01)

(58) Field of Classification Search
None
See application file for complete search history.

(56) References Cited

U.S. PATENT DOCUMENTS

| | | |
|---|---|---|
| 6,591,292 B1 | 7/2003 | Morrison |
| 7,130,999 B2 | 10/2006 | Yasala |

(Continued)

OTHER PUBLICATIONS

"BitCloud," printed from the internet: URL:http://www.bitcloudproject.org, 2014, 14pgs.

(Continued)

*Primary Examiner* — Christopher Revak
(74) *Attorney, Agent, or Firm* — North Weber & Baugh LLP

(57) ABSTRACT

Aspects of the present invention provide systems and methods that allow for a generic, decentralized system that is independent of a centralized resource and allows for the reporting and protecting of all types of smart devices including smart phones, laptop, tablets, or smart packages, and the like. In embodiments, the device comprises a security module or modules that interface with a decentralized network that maintains a secure distributed transactional ledger, or block chain, in order to send and/or receive data via the block chain. In embodiments, the device may not operate when its ability to access a communication channel provided via secure distributed transactional ledger has been impeded or otherwise hindered.

20 Claims, 11 Drawing Sheets

(56) References Cited

U.S. PATENT DOCUMENTS

| | | | |
|---|---|---|---|
| 7,293,270 B1 | 11/2007 | Gupta | |
| 8,886,570 B1 | 11/2014 | Amancherla | |
| 9,135,787 B1* | 9/2015 | Russell | G07F 19/201 |
| 9,256,467 B1 | 2/2016 | Singh | |
| 9,298,806 B1 | 3/2016 | Vessenes | |
| 9,397,985 B1* | 7/2016 | Seger, II | H04L 63/0442 |
| 9,406,063 B2* | 8/2016 | Zhou | G06Q 20/3227 |
| 9,514,293 B1 | 12/2016 | Moritz | |
| 2001/0049726 A1 | 12/2001 | Comeau | |
| 2002/0143819 A1 | 10/2002 | Han | |
| 2005/0004804 A1 | 1/2005 | English | |
| 2006/0069647 A1 | 3/2006 | Cozianu | |
| 2006/0100955 A1 | 5/2006 | Baldassini et al. | |
| 2008/0320565 A1 | 12/2008 | Buch | |
| 2009/0150972 A1 | 6/2009 | Moon | |
| 2012/0163584 A1 | 6/2012 | Adjedj | |
| 2013/0329883 A1 | 12/2013 | Tamayo-Rios | |
| 2014/0201057 A1 | 7/2014 | Shuster | |
| 2014/0279433 A1 | 9/2014 | Holman | |
| 2014/0344015 A1 | 11/2014 | Puértolas-Montañés et al. | |
| 2015/0006739 A1 | 1/2015 | Misra et al. | |
| 2015/0228004 A1 | 8/2015 | Bednarek | |
| 2015/0287026 A1 | 10/2015 | Yang | |
| 2015/0310424 A1* | 10/2015 | Myers | G06Q 20/3678 |
| | | | 705/69 |
| 2015/0348017 A1 | 12/2015 | Allmen | |
| 2015/0356524 A1* | 12/2015 | Pennanen | G06Q 20/065 |
| | | | 705/71 |
| 2015/0356555 A1* | 12/2015 | Pennanen | G06Q 20/06 |
| | | | 705/71 |
| 2015/0371224 A1 | 12/2015 | Lingappa | |
| 2015/0379510 A1 | 12/2015 | Smith | |
| 2016/0071108 A1 | 3/2016 | Caldera | |
| 2016/0086175 A1 | 3/2016 | Finlow-Bates | |
| 2016/0162882 A1 | 6/2016 | McClung, III | |
| 2016/0217436 A1* | 7/2016 | Brama | G06Q 20/06 |
| 2016/0218879 A1* | 7/2016 | Ferrin | H04L 9/3247 |
| 2016/0254910 A1* | 9/2016 | Finlow-Bates | H04L 9/0891 |
| | | | 713/158 |
| 2016/0260069 A1 | 9/2016 | Holman | |
| 2016/0260169 A1 | 9/2016 | Arnold | |
| 2016/0267472 A1 | 9/2016 | Lingham | |
| 2016/0275461 A1* | 9/2016 | Sprague | G06Q 20/0655 |
| 2016/0283920 A1 | 9/2016 | Fisher | |
| 2016/0292672 A1 | 10/2016 | Fay | |
| 2016/0300227 A1 | 10/2016 | Subhedar | |
| 2016/0300234 A1 | 10/2016 | Moss-Pultz | |
| 2016/0306966 A1 | 10/2016 | Srivastava | |
| 2016/0321654 A1* | 11/2016 | Lesavich | G06F 17/30864 |
| 2016/0330027 A1 | 11/2016 | Ebrahimi | |
| 2016/0330031 A1 | 11/2016 | Drego | |
| 2016/0335628 A1* | 11/2016 | Weigold | G06Q 20/065 |
| 2016/0342977 A1* | 11/2016 | Lam | G06Q 20/3829 |
| 2016/0342978 A1 | 11/2016 | Davis | |
| 2016/0342989 A1 | 11/2016 | Davis | |
| 2016/0342994 A1 | 11/2016 | Davis | |
| 2016/0344543 A1 | 11/2016 | Alness | |
| 2016/0350749 A1 | 12/2016 | Wilkins | |
| 2016/0358184 A1 | 12/2016 | Radocchia | |
| 2017/0005804 A1 | 1/2017 | Zinder | |
| 2017/0061398 A1 | 3/2017 | Joseph | |
| 2017/0236123 A1 | 8/2017 | Ali | |
| 2017/0243241 A1 | 8/2017 | Boutelle | |
| 2017/0279800 A1 | 9/2017 | Castinado | |
| 2017/0295021 A1 | 10/2017 | Aranda Gutierrez | |
| 2017/0310653 A1 | 10/2017 | Zhang | |

OTHER PUBLICATIONS

Buterin, Vitalik, Ethereum White Paper, "A Next Generation Smart Contract & Decentralized Application Platform," 2014, printed from the internet: URL:http://ethereum.org/pdfs/ethereumwhitepaper.pdf, 36pgs.

Satoshi Nakamoto, "Bitcoin: A Peer-to-Peer Electronic Cash System," 9pgs.

Wood, Dr. Gavin, "Ethereum: A Secure Decentralised Generalised Transaction Ledger Final Draft—Under Review," www.ethereum.org, 2014, printed from the internet: URL:http://gavwood.com/paper.pdf, 29pgs.

Namecoin, printed from the internet: URL:http://namecoin.info/, 3pgs.

Syscoin, printed from the internet: URL:http://syscoin.org/, 2pgs.

Syscoin, printed from the internet: URl: http://syscoin.org/doc_uploads/How_Syscoin_Innovates_Infographic.png.

Szabo, Nick, "The Mental Accounting Barrier to Micropayments," printed from the internet: URL:http://szabo.best.vwh.net/micropayments.html, 1996, 4pgs.

Rizzo, Pete, "Fred Wilson: Blockchain Applications Still Biggest Opportunity in Bitcoin," Jan. 24, 2015, printed from the internet: URL: http://www.coindesk.com/fred-wilson-blockchain-applications-still-biggest-opportunity-bitcoin/, 7pgs.

Non-Final Office Action dated Dec. 29, 2016, in U.S. Appl. No. 14/732,504 (17 pgs).

Non-Final Office Action dated Jan. 17, 2017, in U.S. Appl. No. 14/750,822 (18 pgs).

Non-Final Office Action dated Jan. 20, 2017, in U.S. Appl. No. 14/725,347 (42 pgs).

Kitahara et al, "A Method of Digital Rights Management based on Bitcoin Protocol", Jan. 2014, IMCOM (ICUIMC), ACM p. 1-6, (6 pgs).

Underwood, "Blockchain Beyond Bitcoin", Nov. 2016, Communications of ACM, vol. 59, No. 11, p. 15-17, (3 pgs).

Maxwell et al, "'Effing' the Ineffable: Opening up Understandings of the Blockchain", Jul. 2015, British HCI, ACM, p. 208-209, (pp. 2).

Crary et al, "Peer-to-Peer Affine Commitment using Bitcoin", Jun. 2015, PLDI' 15, ACM, p. 479-488, (10 pgs).

Dziembowski, "Introduction to Cryptocurrencies", Oct. 2015, CCS' 15, ACM, p. 1700-1701, (2 pgs).

Coeckelbergh et al, "Cryptocurrencies as Narrative Technologies", Sep. 2015, SIGCAS Computers & Society, vol. 45, No. 3, p. 172-178, (7pgs).

Anteniese et al, "Certified Bitcoins", Sapienza-University of Rome, Italy, ACNS 2014, pp. 80-96, (17 pgs).

Barber et al, "Bitter to Better—How to make Bitcoin a Better Currency," 2012, pp. 399-414, (16pgs).

Final Office Action dated Jul. 7, 2017, in U.S. Appl. No. 14/732,504, (14 pgs).

Response filed Sep. 7, 2017, in related U.S. Appl. No. 14/732,504, (10 pgs).

Non-Final Office Action dated Jun. 22, 2017, in U.S. Appl. No. 14/750,347, (41 pgs).

Response filed Sep. 22, 2017, in related U.S. Appl. No. 14/732,504, (12 pgs).

Final Office Action dated Jul. 26, 2017, in U.S. Appl. No. 14/750,822, (24 pgs).

Non-Final Office Action dated Nov. 9, 2017, in U.S. Appl. No. 14/732,504 (8 pgs).

Peck, "Do You Need a Blockchain? This Chart will tell you if the technology can solve your problem", Oct. 2017, IEEE, p. 1-3 (3 pgs).

Crosby et al, "BlockChain Technology, Beyond Bitcoin", Oct. 16, 2015, Sutardja Center fro Entrepreneurship & Technology Technical Report, p. 1-35 (35 pgs).

Boudguiga et al, "Towards Better Availability and Accountability for IoT Updates by means of a Blockchain", 2017, 2017 IEEE European Symposium on Security and Privacy Workshops (EuroS &PW), p. 50-58 (4pgs).

Notice of Allowance and Fee Due dated Nov. 24, 2017, in U.S. Appl. No. 14/750,822 (8 pgs).

Response filed Sep. 22, 2017 in related U.S. Appl. No. 14/725,347, (12 pgs).

Response filed Dec. 19, 2017 in related U.S. Appl. No. 14/732,504, (8 pgs).

Non-Final Office Action dated Jun. 1, 2017, in related U.S. Appl. No. 14/635,577 (7 pgs).

(56) References Cited

OTHER PUBLICATIONS

Response filed Aug. 11, 2017, in related U.S. Appl. No. 14/635,577 (7 pgs).
BitTorrent; From Wikipedia, the free encyclopedia; Feb. 25, 2016; pp. 1-23; http://en.wikipedia.org/wiki/BitTorrent (22 pgs).
The Byzantine Generals Problem; ACM Transactions on Programming Languages and Systems (TOP LAS); vol. 4 Issue 3, Jul. 1982 pp. 382-401; ACM New York, NY, USA; http://dl.acm.org/citation.cfm?id=357176m (20 pgs).
Bitcoin: A Peer-to-Peer Electronic Cash System; Satoshi Nakamoto; www.bitcoin.org; May 24, 2009; pp. 1-9; hllps://bitcoin.org/bitcoin.pdf (9 pgs).
A Next Generation Smart Contract & Decentralized Application Platform, Vitalik Buterin; Ethereum White Paper; Aug. 16, 2005; pp. 1-36; hllps://www.ethereum.org/pdfs/EthereumWhitePaper.pdf (36 pgs).
Ethereum: A Secure Decentralised Genralised, Final Draft—Under Review; Dr. Gavid Wood; Lead, Ethereum Project; Apr. 6, 2014; pp. 1-34; http://gavwood.com/paper.pdf (32 pgs).
Final Office Action dated Oct. 24, 2017, in U.S. Appl. No. 14/635,577 (16 pgs).
Final Office Action dated Jan. 12, 2018, in U.S. Appl. No. 14/725,347, (43 pgs).
Notice of Allowance and Fees Due dated Jan. 17, 2018, in U.S. Appl. No. 14/732,504, (12 pgs).
Notice of Allowance and Fees Due dated Jan. 24, 2018, in U.S. Appl. No. 14/750,822, (17 pgs).

* cited by examiner

DEVICE REPORTING AND PROTECTION SYSTEMS AND METHODS USING A SECURE DISTRIBUTED TRANSACTIONAL LEDGER

CROSS-REFERENCE TO RELATED APPLICATION

This patent application claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor, which patent document is incorporated by reference herein in its entirety and for all purposes.

A. TECHNICAL FIELD

The present disclosure relates to information handling devices, such as smart phones, tablet, and laptops. More particularly, the present disclosure related to systems and methods for improving the tracking and protecting of mobile information handling systems.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The last several years has also seen a dramatic increase in the computing capabilities, along with significant reductions in size and power consumption. As a result, information handling systems exist in many different form factors, including laptops, mobile phones, tablets, smart watches, and phablets. These devices provide powerful computing resources and are extremely portable.

However, one problem with the portability of these devices is that they can be often lost or stolen. Because these device can carry important information, it can be critical that they be located, remotely accessed, or both. To help in this regard, device manufacturers and service providers have created specialized applications that help in locating or remotely accessing the device. But, such approaches have some signification drawbacks.

First, these applications tend to be specific to the device or to the service provider. Second, these applications rely on a specific centralized provider in order to correctly operate. If that centralized provider is blocked or no longer offers the service, then the application becomes useless. Third, because it a centralized service, the application is susceptible to spoofing and other such attacks. Finally, the centralized service has a powerful role and can compromise the service or take actions that are unwanted by the device owner.

Accordingly, what is needed are systems and methods that allow for a generic, decentralized system that is independent of a centralized resource and allow for the automatic reporting and protecting of mobile information handling devices.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
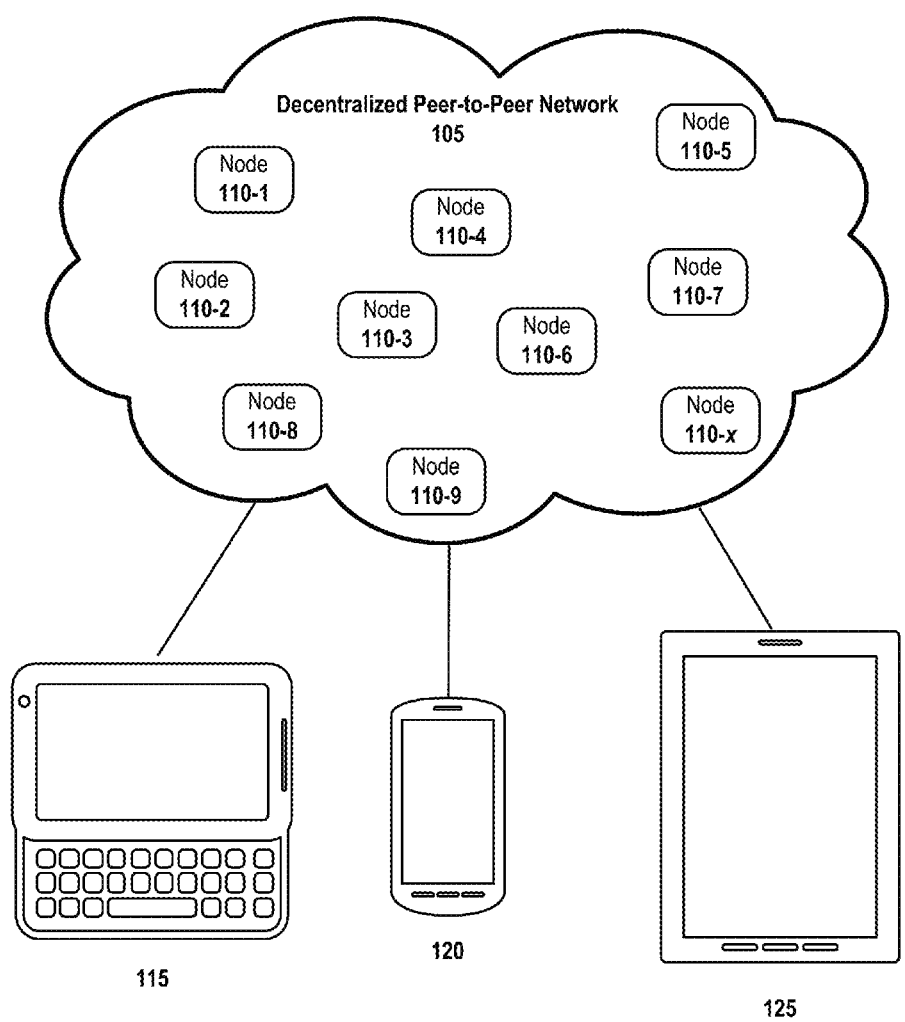
FIG. 1 ("FIG. 1") depicts a decentralized network for providing communications to and from mobile devices according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits that can be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide systems and methods that allow for a generic, decentralized system that is independent of a centralized resource and allows for the automatic reporting and protecting of information handling devices, with no hindrance. The process of reporting and protecting an information handling device is designed such that if the process is hindered, such as by a malicious agent (e.g., someone who has stolen the device), then the process restricts the device from functioning. Also, the decentralized nature of the systems disclosed herein also prevents elements of the process, external to the device being protected, from being hindered, or corrupted, when performing their functions. In embodiments, if either aspect is compromised, the device will recognize the situation and protect itself. While the embodiments depicted herein are principally directed to securing mobile devices, it shall be noted that the present invention is not limited to such devices and could be used or adapted for use with other information handling systems.

FIG. 1 depicts an embodiment of a distributed peer-to-peer network 105, which comprises a plurality of nodes 110-1 through 110-$n$ (which may be referred to herein individually or collectively (depending upon context) as 110-$x$) and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display.

Peer-to-peer network 105 represents a computing environment for operating a decentralized framework that maintains a distributed data structure, which may be referred to herein as a secure distributed transaction ledger or a block chain. This secure distributed transaction ledger may support various functions, such as distributing computational tasks from one or more systems to one or more other systems, supporting a cryptocurrency, messaging, among other functions.

To maintain the secure distributed transaction ledger among the various nodes 110-$x$ in the peer-to-peer network 105, a set of procedures are followed. Generally, such a network would suffer from inherent uncertainty and distrust between the nodes when they transact because they are typically unaffiliated with each other, may be transacting across vast distances (including in different countries), may be transacting anonymously, and because there is no centralized control or management to monitor or to resolve disputes. However, because the ledger is maintained publicly (i.e., all nodes can get a copy of the ledger) and because it is maintained according to set procedures that employ cryptographic methods and a proof-of-work concept, the uncertain and distrust elements are mitigated.

Thus, in embodiments, the secure distributed transaction ledger, or block chain, is a public ledger maintained collectively by the nodes in the network 105. The block chain includes blocks with data regarding recent transactions and/or messages, linking data that links one block to its previous block in the block chain, proof-of-work data the ensure that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In embodiments, the new transactions are added to the block chain using a distributed consensus system that confirms these pending transactions by including them in the block chain through a process commonly referred to as "mining." Mining enforces a chronological order in the block chain and helps create and maintain integrity of the system. For transactions to be confirmed during the mining process, the transactions must be packed in a block and linked to the prior block, all according to a set procedures involving cryptography.

Properly adding a block to the chain is very computationally intensive, but it is also relatively easy to verify. Because of this computational asymmetry, the block chain can be readily verified but nearly impossible to modify while maintaining the correct chaining. Thus, this linking prevents previous blocks from being modified because doing so would invalidate all following blocks.

In embodiments, as a reward for mining, nodes earn fees for the transactions that they successfully add to the block chain. However, the mining is so difficult that it essentially creates a competitive lottery between the nodes in which the node that is able to successfully add the block to the chain, before any other node, gets rewarded. In embodiments, the reward can be units of a cryptocurrency.

A cryptocurrency is a virtual currency that utilizes a block chain to maintain and operate payment transactions securely and transparently. Examples of different instances of cryptocurrencies include Bitcoin, Linkcoin, Ripple, NXT, Ether, or other cryptocurrencies.

In embodiments, data is received by one or more nodes in the peer-to-peer network for inclusion in the block chain. This data is generally referred to as a "transaction" and is made available generally to the nodes in the peer-to-peer network. A node that is functioning as a mining node will collect a set of such transactions and group them into a prototype block for potential inclusion as the next block in the block chain. That linkage is recorded by storing the unique identifier (i.e., the cryptographic checksum) of the most recent block in the chain inside of the (new) prototype block such that any reference to the prototype block (via its yet-to-be-determined cryptographic checksum identifier) can be used to find the block previous to it in the chain (i.e., the current block). This arrangement creates a linked "chain" of blocks that can be easily traversed.

The prototype block will only be included in the generally available block chain maintained by the peer-to-peer network if its cryptographic checksum identifier (e.g., a 256-bit integer) meets particular constraints; typically it must be less than a certain, network-determined, value. To accomplish this, the mining node must set the value of an integer called the "nonce," which will be included in the checksum calculations of the prototype block, to any value that produces an appropriate checksum value. All of the blocks in the block chain contain such a value to produce an appropriate cryptographic checksum value for their particular block; typically each value will be different.

The process of determining the value of the nonce is non-trivial, and basically amounts to a search through all possible nonce values. Finding such a value is conventionally called "proof-of-work," reflecting the large amounts of computational effort (i.e., "work") required to find a valid nonce value. In reality, finding a valid nonce value is really much more like "winning" a computational "lottery."

Once a mining node finds a valid nonce value for its prototype block, it then broadcasts the block to the other nodes in the peer-to-peer network. The block will be validated by the other nodes in the network, by, among other means, computing its cryptographic checksum. The network nodes express their acceptance of the new block by working on creating the next (prototype) block in the chain, a block with a different set of transactions, and (most likely) a different nonce value. The cryptographic checksum identifier of the newly accept block will be included in the prototype block to maintain the integrity of the chain.

Another agreed-upon procedure is that the nodes always consider the longest chain to be the correct one. Because it may take time for the block to propagate through the network and because two nodes may broadcast different versions of the next block at the same time, some nodes may receive one version of the block before the other version. In such cases, a node will work on the first one it received, but save the other branch in case it becomes the longer block chain. The decision which branch to follow is made when the next proof-of-work is found and one branch becomes longer; the nodes that were working on the other branch will then switch to the longer branch. This process establishes a "consensus" version of the block chain (i.e., the one accepted by the majority), which is extremely difficult to corrupt; doing so would require mustering computational power greater than that of the current majority of mining nodes in the peer-to-peer network.

In embodiments, new transaction broadcasts do not necessarily need to reach all nodes. As long as they reach many nodes, they will get into a block. In embodiments, block broadcasts are also tolerant of dropped messages. If a node does not receive a block, it will request it when it receives the next block and realizes it missed one.

The initial concept of secure distributed transaction ledger, including cryptocurrency, was proposed in 2009 in a paper entitled "Bitcoin: A Peer-to-Peer Electronic Cash System," listing Satoshi Nakamoto as the author, which is incorporated by reference herein. The details of maintaining and assuring the state of a secure distributed transaction ledger (or block chain) are known in the art and shall not be discussed further herein.

Returning to FIG. 1, one or more portable information handling systems, such as a laptop 115, mobile phone 120, or tablet 125 may be configured to connect to the peer-to-peer network 105 to help with misplaced or stolen mobile device according to embodiments of the present invention. In embodiments, the mobile devices may be full nodes of the peer-to-peer network in which they perform mining processes, or they may be watching nodes that perform limited functions, embodiments of which are described herein.

B. Block Chain as a Communication Vehicle

Figure 2:
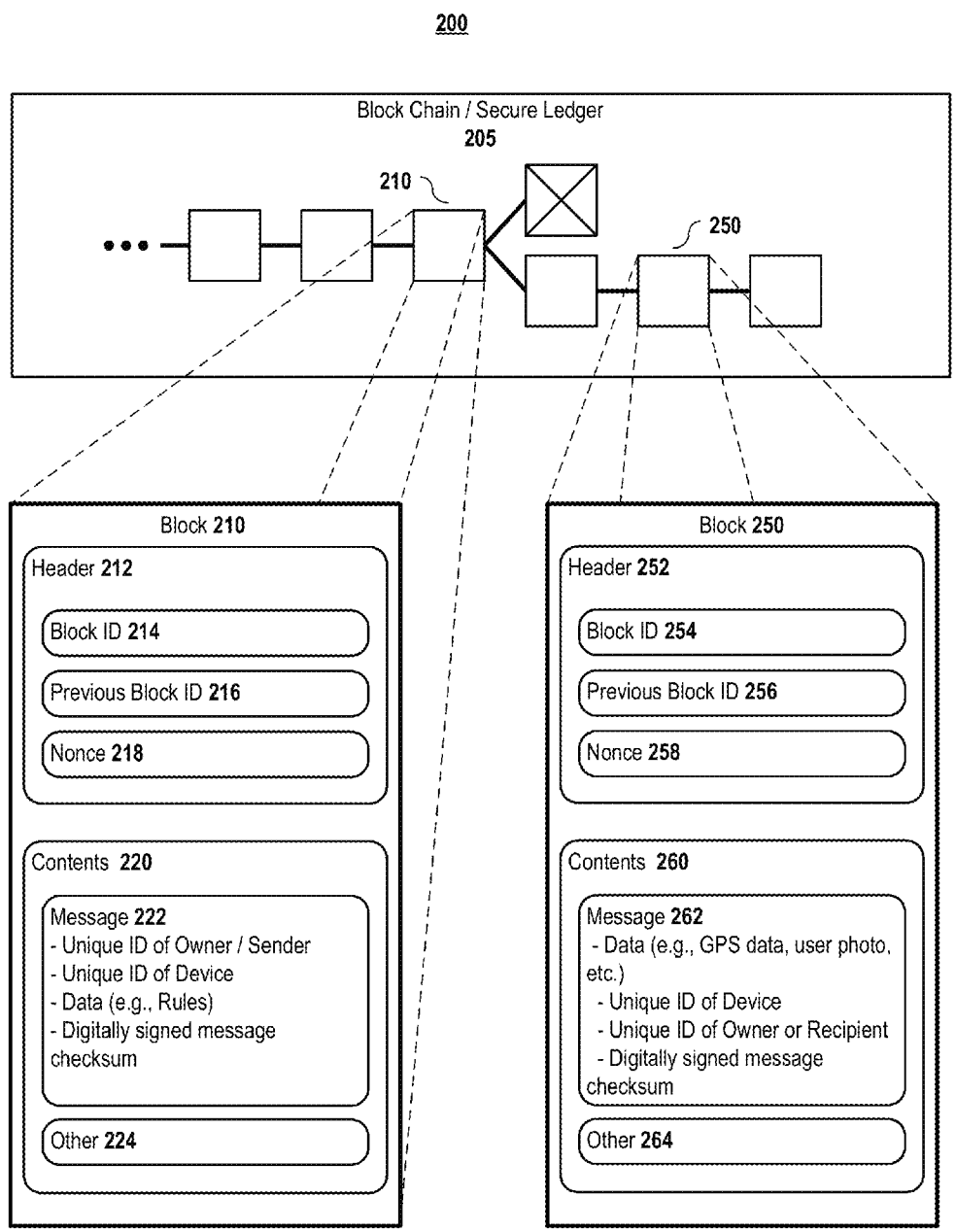
FIG. 2 graphically depicts a block chain or decentralized secure transaction ledger and two sample communications or messages according to embodiments of the present invention.

In embodiments, a distributed secure transactional ledger, or block chain, may be used to communicate data between entities. FIG. 2 graphically depicts a block chain or decentralized secure transaction ledger 205 that is maintained by nodes in a peer-to-peer network. Also depicted in FIG. 2 are examples of two sample communications or messages according to embodiments of the present invention. It shall be noted that using the block chain to communicate information and messages has several benefits. First, messages can be sent to a mobile device, from a mobile device, or both. Second, it does not rely on a centralized authority. Third, once a message is added to the block chain, it cannot be altered or removed. Fourth, it is decentralized so it is difficult, if not impossible, to block access to it. Consider, by way of example, the messages embedded within the block chain 205 depicted in FIG. 2.

1. Messages to a Mobile Device

In embodiments, the block chain 205 may be used to send messages to a mobile device. Consider, by way of example, a message in block 210 of the block chain 205. In embodiments, a block 210 may contain a header 212 and contents 220.

In embodiments, the header 212 comprises a block ID 214 for that block, a block ID 216 of the previous block, and a nonce value 218, which represents the "proof of work." In embodiments, this information is used in linking the block into the block chain.

In embodiments, the contents 220 may comprise one or more messages 222 and may also include other data 224. In embodiments, a message 222 may comprise a unique identifier of the owner or sender of the message. This information may be used for one or more purposes. For example, the identifier helps the mobile device identify who send the message. In embodiments, the mobile device may be sent messages from various third parties, but may only take direction from an authorized set of one or more entities. The identifier of the owner or sender also provides a way by which the mobile device can address a response to the sender. Additionally, the identifier of the owner/sender may be used or linked to an account to pay for processing fees or other fees associated with using the block chain as a communication channel, to perform calculations, or other actions. Alternatively, a separate account identifier (not shown) may be used for payment purposes.

Also shown in the embodiment depicted in FIG. 2 is a unique identifier that identifies the mobile device. In embodiments, the mobile device includes an interface to the peer network to obtain the block chain and analyzes the block for messages addressed to it. The identifier of the device indicates to the device that this message is intended for it.

In embodiments, the message 222 may include data for the mobile device. This data may include rules related to device security. For example, the rules may include one or more of the following: (1) what data the mobile device is to collect (e.g., photos, audio, video, GPS, sign-on or attempted sign-ons, etc.); (2) one or more criteria, triggers, or schedules for when to collect data; (3) one or more criteria, triggers, or schedules for when data is to be uploaded via the secure distributed transactional ledger; (4) one or more criteria or triggers related to potential security risks as informed by the collected data; (5) one or more actions to be taken if a potential security risk is triggered; and/or (6) other instructions or rules.

In embodiments, the message 222 may include a digitally signed message checksum as way for the mobile device to verify the origin of the message. For example, the sender of the message may digitally sign a checksum or hash of the message using his or her private key. The mobile device can verify that the message's origin by verifying the checksum or hash using the sender's public key. In this way, only those individuals or entities that are authorized to send messages to the mobile device will be acknowledged and followed by the mobile device. Those having skill in the art shall recognize that other methods for verifying the sender may also be employed herein.

2. Messages from a Mobile Device

In embodiments, the block chain 205 may be used to send messages from a mobile device. Consider, by way of example, a message in block 250 of the block chain 205. In embodiments, a block 250 may contain a header 252 and contents 260.

Like the header 212 discussed with respect to block 210, the header 252 of block 205 comprises a block ID 254 for that block, a block ID 256 of the previous block, and a nonce value 258, which represents the "proof of work."

Similar to the message in the block 210, in embodiments, the contents 260 may comprises one or more messages 262 and may also comprise other data 264. In embodiments, a message 262 may comprise a unique identifier of the device that is the sender of the message. This information may be used for one or more purposes. For example, the identifier helps identify who send the message. Additionally, the identifier of the mobile device may be used or linked to an account to pay for processing fees or other fees associated with using the block chain as a communication channel, to perform calculations, or other actions. Alternatively, a separate account identifier may be used for payment purposes.

Also shown in the embodiment depicted in FIG. 2 is a unique identifier that identifies the recipient, which may be the owner of the device or a third party (including a service). Alternatively, the message may not include a recipient but may merely be posting data to be recorded into the block chain or may be intended for any of the peers in the node to view and act upon as instructed in the message. As mentioned above, in embodiments, the mobile device includes an interface to the peer network, which allows the mobile device to post the message for inclusion into the block chain.

In embodiments, the message 262 may include data from the mobile device. For example, the data may include one or more of the following: (1) data the mobile device has collected (e.g., photos, audio, video, GPS, sign-on or attempted sign-ons, etc.); (2) data about when and/or where the data was collected; (3) one or more messages or alerts; and/or (4) other data. In embodiments, the message may include an address or identifier for an application or program to operate on the supplied data. In embodiments, this address may be an address within the block chain and the data at that location may be program code (or bytecode) or may be a link or pointer to the program. Thus, in embodiments, a node in the peer-to-peer network may recognize that address as a request for execution of the identified program, will execute the program (which may, in embodiments, include using data that was supplied by the mobile device), and take an action (such as posting a result to the block chain). In embodiments, the data may include a container execution request that includes information associating the mobile system with a containerized computational task.

C. Methods for Secure Reporting and/or Recovery of a Device

In embodiments, a security feature of the device controls operation of the device in that if the device is unable to access the peer-to-peer network, the security feature can disable parts or all of the device's functionality.

Figure 3:
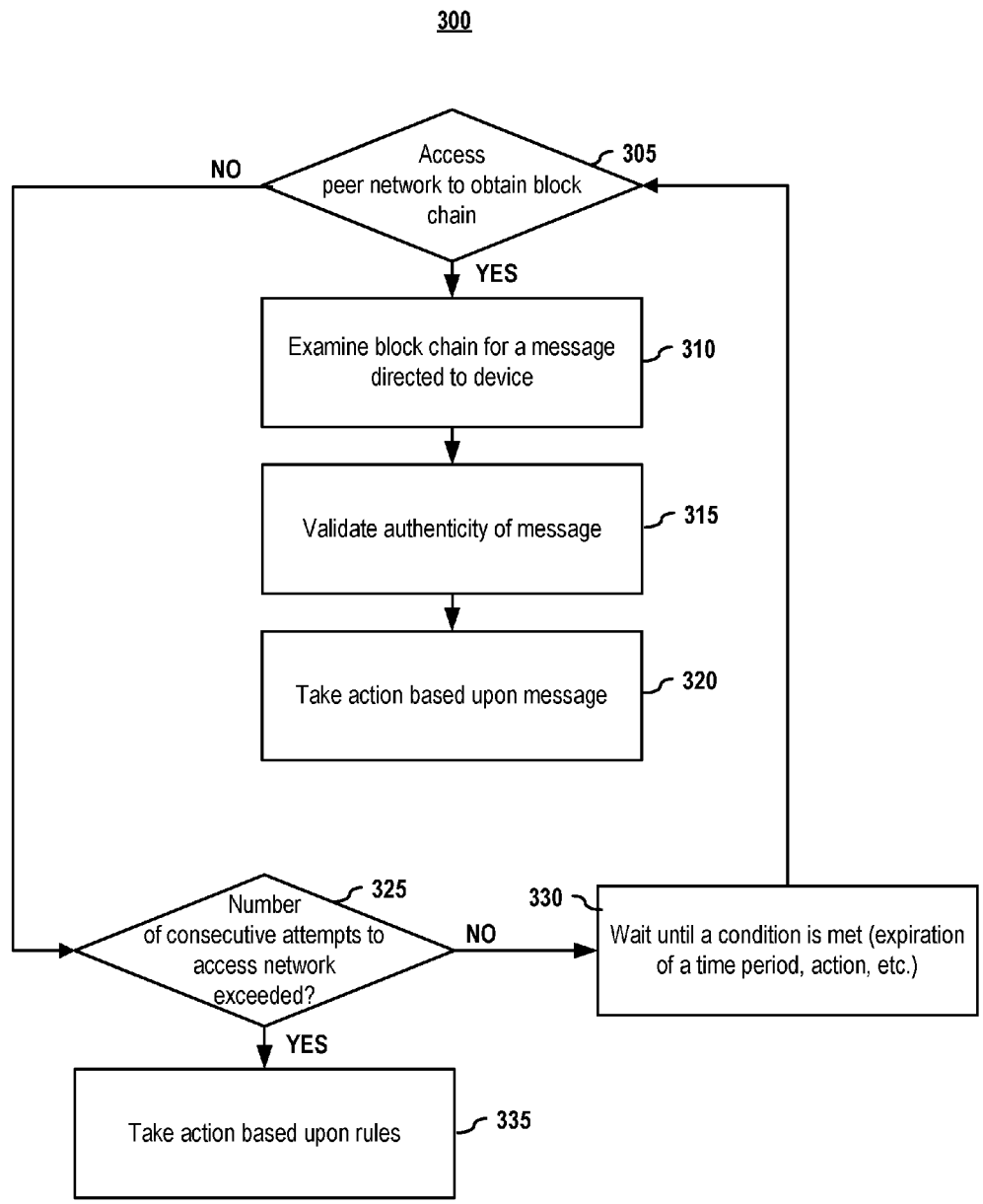
FIG. 3 depicts a method for securing a mobile device using a secure distributed transactional ledger according to embodiments of the present invention.

1. Security Actions Related to the Ability to Access or not Access the Block Chain FIG. 3 depicts a method for secure reporting and/or recovery of a mobile device using a secure distributed transactional ledger according to embodiments of the present invention. In embodiments, the device automatically attempts to access (305) the peer network to obtain access to the block chain. The schedule of when the device makes the attempts to access the peer network may be user-selected, set by schedule, fixed, triggered by rules or criteria, or any combination thereof.

In embodiments, if the device is able to obtain a copy of the block chain, it may examine (310) the block chain for any messages directed to it. Upon finding a message directed to it, the device may verify (315) that the message is from an authorized entity from which the device is to take orders. In embodiments, the device may have a pre-set list of authorized entities, which may (in embodiments) be changed by an entity with appropriate authorization (e.g., a successfully authenticated user).

Assume that a new message for the device is present, and, is from an authorized entity, the device may take one or more actions based upon the message. For example, the message may require the device to update its rules, to wipe certain data, to lock itself, to report data (such as its location), etc., or a combination thereof.

In embodiments, if the device is unable to access (305) the peer network, it may check whether a number of consecutive attempts to access the peer network has been exceeded (325).

If the number of attempts to access the peer network has not been exceeded, the device may wait (330) until a condition has been met (expiration of a time period, occurrence of an action, etc.) and retry accessing the peer network. This iterative process is beneficial in cases when the device is temporally in an area without limited or no network access.

If the number has been exceeded, in embodiments, the device may consider this a trigger condition that it is likely being interfered with and can take (335) one or more actions based upon its locally available rules. In embodiments, when a triggering criterion or criteria are met, one or more actions taken by the device may include: disabling some or all functions of the device; wiping data; capturing contextual data (e.g., picture of user, audio data of user and/or surroundings, etc.); sending one or more alert message (e.g., via phone, text, email, or otherwise) to the owner of the device, which alert message may include some of all of the contextual data; and presenting an alert or alerts to the current user of the device.

Figure 4:
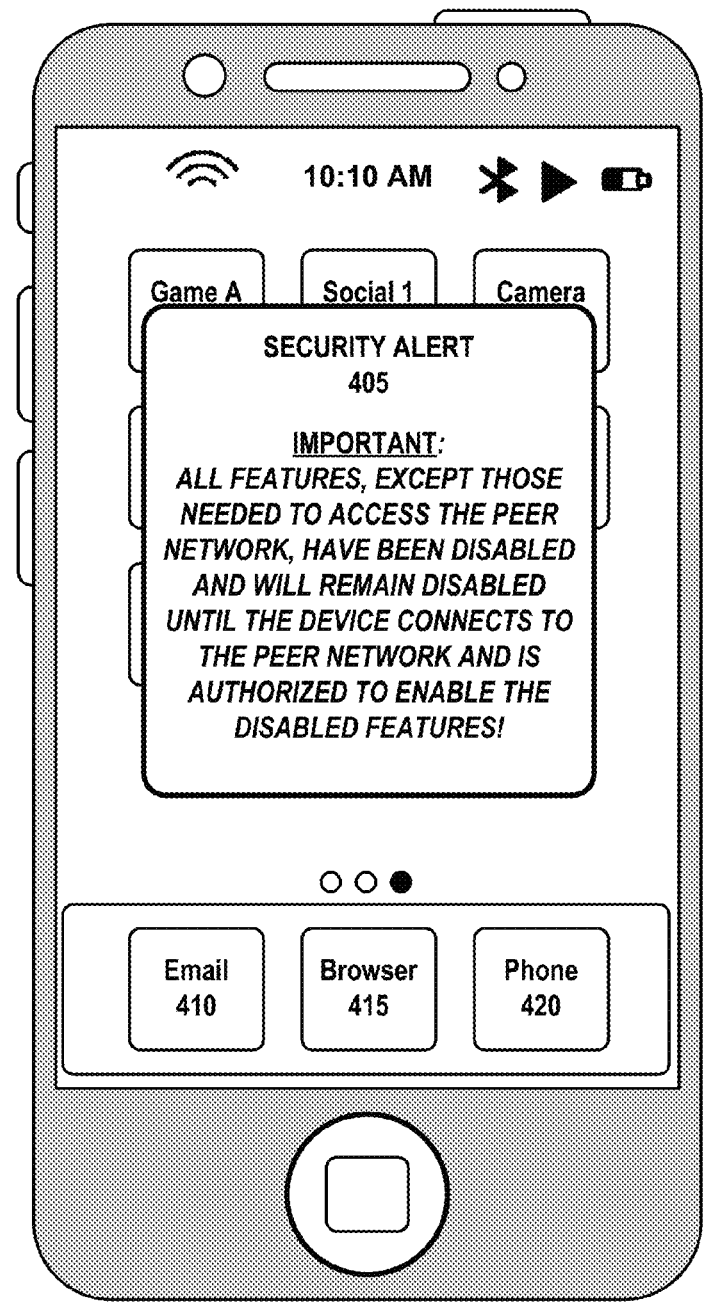
FIG. 4 depicts a sample security alert provided to a user of a mobile device according to embodiments of the present invention.

FIG. 4 depicts a sample security alert 405 provided to a user of a mobile device 400 according to embodiments of the present invention. As shown in FIG. 4, the alert message to the user notifies the user that all features, except those needed to access the peer network, have been disabled and will remain disabled until the device connects to the peer network and is authorized to enable the disabled features. In embodiments, a specific authorization may be needed from a new message for the device in the block chain; alternatively, so long as the block chain does not contain a new message for the device that it is missing or stolen, the device may resume normal operations.

2. Device Data Uploaded to the Block Chain

Figure 5:
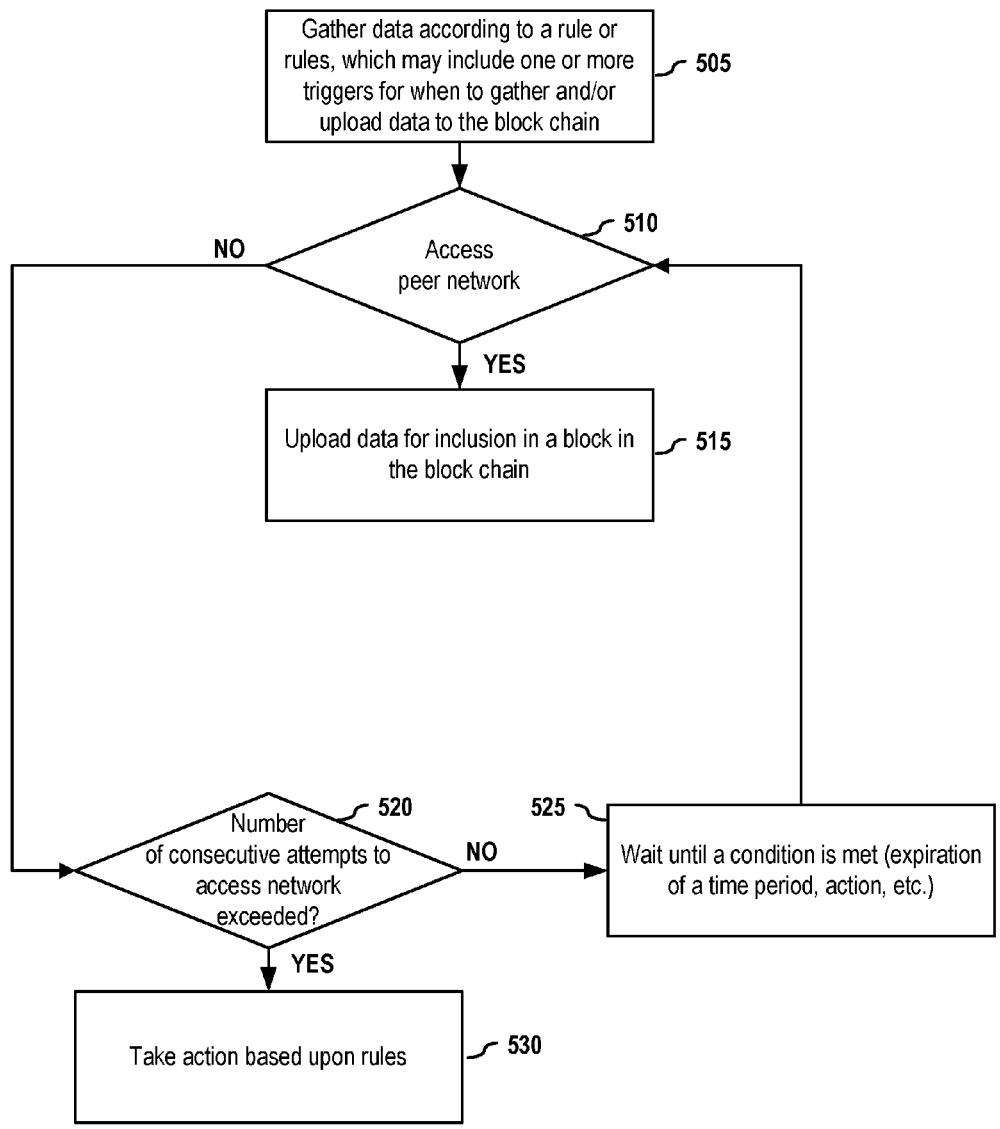
FIG. 5 depicts a method for providing data from a mobile device to a secure distributed transactional ledger according to embodiments of the present invention.

FIG. 5 depicts a method for providing data from a mobile device to a secure distributed transactional ledger according to embodiments of the present invention. In embodiments, the device gathers (505) data according to a rule or rules, which may include one or more triggers for when to gather and/or upload data to the block chain. When it is time to upload the data, the device attempts to access (510) the peer network. If the device is able to access the peer network, the data is uploaded (515) for inclusion in a block in the block chain. In embodiments, to keep data in the chain obfuscated from third parties, the data may be encrypted.

In embodiments, the data is received by one or more nodes in the peer network. This data, which may be considered a "transaction" to nodes in the network, is broadcast to all nodes. Each node acting in the role of a miner collects a set of new "transactions" into a block and then mining nodes work on finding a proof-of-work for this block. Once a node finds a proof-of-work, it then broadcasts the block to the other nodes in the network. This information, when added to the block chain, is permanently part of the block chain and cannot be removed or altered.

As with the prior method, the mobile device may check if it has too many unsuccessfully attempts to access (520) the network and take appropriate action (525 or 530) depending upon whether the limit has been exceeded.

3. Using Device Data to Detect Security Risk a) Processing by Another Device

Figure 6:
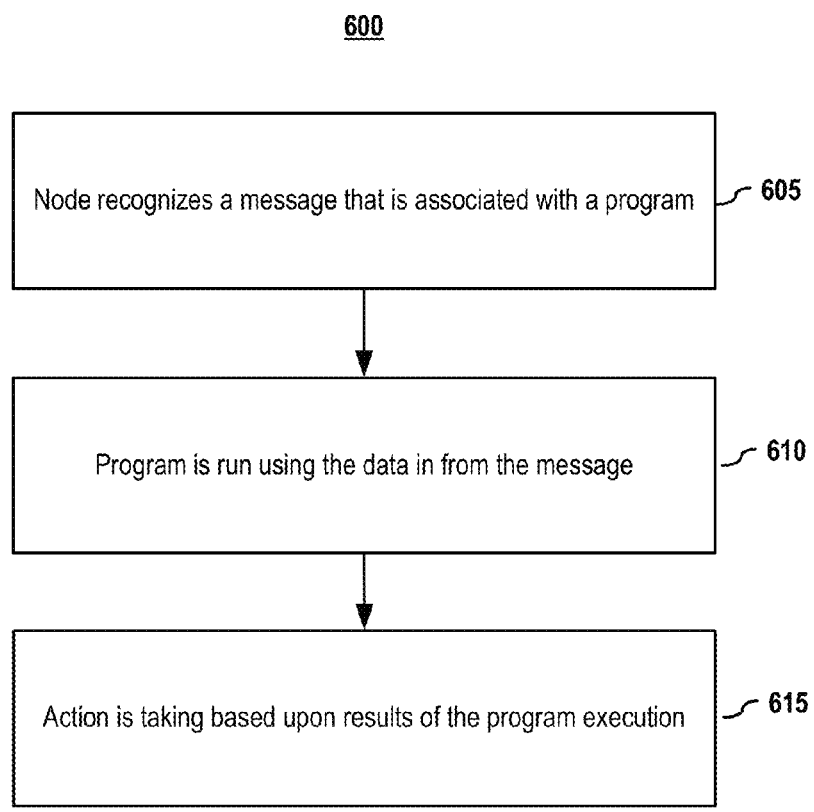
FIG. 6 depicts a method for using data captured by a mobile device to detect potential security risks associated with the mobile according to embodiments of the present invention.

FIG. 6 depicts a method for using data captured by a mobile device to detect potential security risks associated with the mobile according to embodiments of the present invention.

As noted previously, the data uploaded by the device may include an address or identifier for an application or program to operate on the supplied data. In embodiments, this address may be an address recorded within the block chain and the data associated with that address may be program code, or, may be a link or pointer to a program. Thus, in embodiments, a node in the peer-to-peer network may recognize (605) that address as a request for execution of the identified program. In embodiments, the node executes (610) the program (which may, in embodiments, include using some or all of the data that was supplied by the mobile device in the upload or uploads).

Finally, in embodiments, one or more actions may be taken based upon results of the program execution. By way of illustration, in embodiments, the program may analyze contextual data about of the device relative to set of rules and, responsive to a violation of one or more rules, a security action may be taken. For example, if the device is located outside a geographic region, if a picture of the user is not recognized, or if unusual activity is occurring on the device, one or more actions may be triggered. The action or actions may include, by way of example, posting a results message to the block chain or elsewhere, sending a message to the user, sending a message to the device, sending a message to the owner of the device, alerting police, or any combination thereof.

Figure 7:
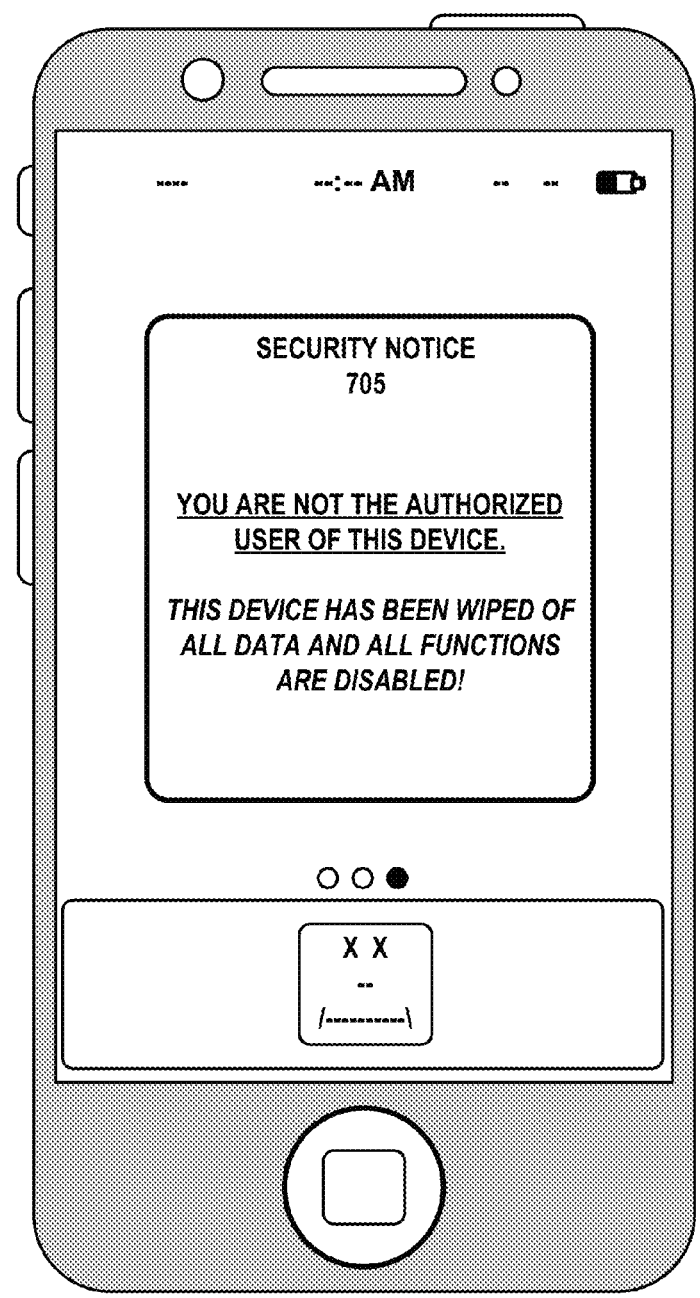
FIG. 7 depicts a sample security notice provided to a user of a mobile device according to embodiments of the present invention.

FIG. 7 depicts a sample action and security notice provided to a user of a mobile device according to embodiments of the present invention. In embodiments, a command has been sent to the mobile device 700 to erase data and disable functionality of the device. The command may be sent directly to the device or via the block chain. Furthermore, as shown in FIG. 7, the device 700 also is displaying an alert to the current user that they are not the authorized user of this device, and the device has been wiped of all data and all functions are disabled.

b) Using Uploaded Data as a Trail or Check-in

Figure 8:
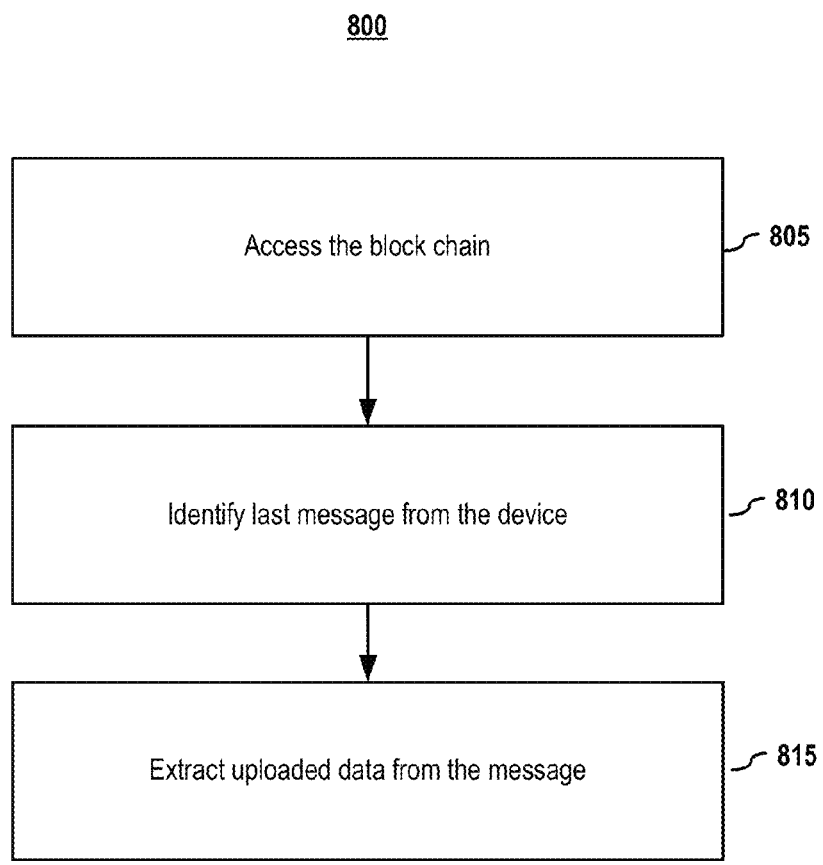
FIG. 8 presents a method for using data captured by a mobile device to identify information about the mobile according to embodiments of the present invention.

In embodiments, the mobile device may periodically upload data about the device, which acts as a "trail of breadcrumbs." For example, the device may periodically upload its location or other identifying data. FIG. 8 presents a method for using data captured by a mobile device to identify information about the mobile according to embodiments of the present invention. When a user seeks to find the device, an information handling system may be used to check (805) the block chain for the last upload or uploads (810) from the device. Having identified the appropriate messages, the user may use the information handling system to extract (815) the uploaded data to identify where the device currently is located, how it is being used, who is using it, etc. In embodiments, to keep data in the chain obfuscated from third parties, data sent to and/or from the mobile device may be encrypted.

c) Device Data Processed by the Device to Detect Security Risk

Figure 9:
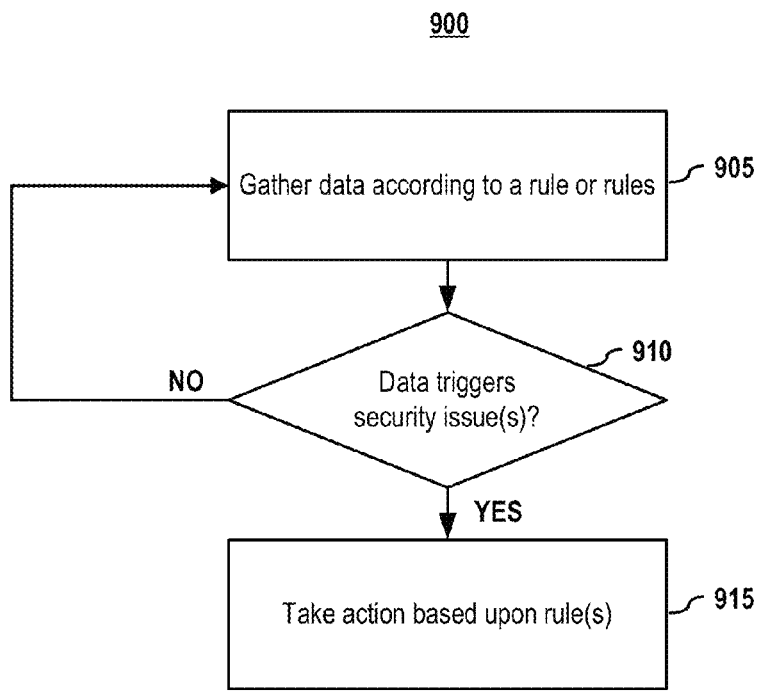
FIG. 9 presents a method for a mobile device to detect potential security risks associated with the mobile based upon captured data and rules according to embodiments.

In embodiments, the data collected by the mobile device may be processed by the device itself in addition to uploading it, or as an alternative. FIG. 9 presents a method for a mobile device to detect potential security risks associated with the mobile based upon captured data and rules, which may be supplied via a secure decentralized transactional ledger, according to embodiments.

As depicted in FIG. 9, the device gathers (905) contextual data according to one or more rules. In embodiments, the device analyzes the data to determine whether the data triggers (910) any security issues, which may be set by one or more rules. If a security issue has been recognized, the device may take action (915) based upon one or more rules. In embodiments, the actions may include, by way of example, posting to the block chain, sending a message to the user, sending a message to the owner of the device, alerting police, disabling the device, erasing data on the device, or any combination thereof.

D. System Embodiments

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 10:
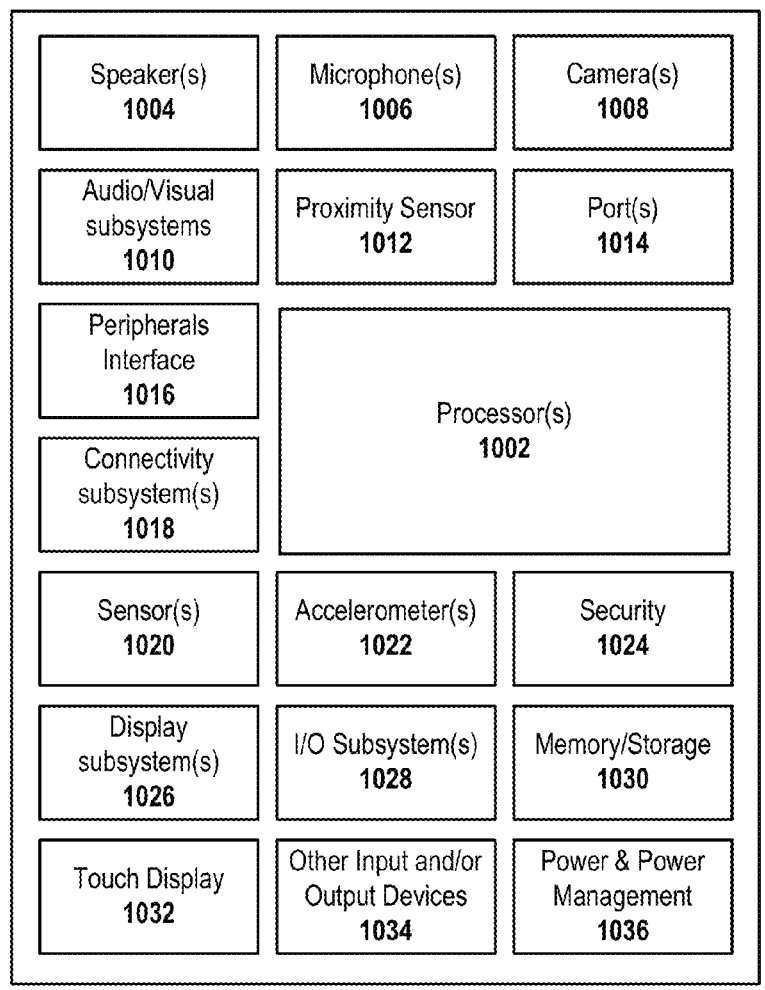
FIG. 10 depicts a simplified block diagram of a mobile information handling system according to embodiments of the present invention.

FIG. 10 depicts a simplified block diagram of an information handling system according to embodiments of the present invention. It will be understood that the functionalities shown for system 1000 may operate to support various embodiments of an information handling system—although it shall be understood that an information handling system may be differently configured and include different components.

Examples of mobile information handling systems or portable multifunction devices include iPhone®, iPads®, iPod Touch® from Apple Inc. of Cupertino, Calif., and Android-based phones, tablets, and phablets. It shall be noted that while discussions herein include mobile devices with a touch-sensitive display surface, it should be understood that one or more other user-interfaces may be included and/or used, including a keyboard, a mouse, optical input, voice input, and the like.

As illustrated in FIG. 10, in embodiments, the system comprises one or more of: processing units 1002, speakers 1004, microphones 1006, cameras 1008, audio/visual subsystems 1010, proximity sensors 1012, ports 1014, peripheral interface subsystems 1016, connectivity subsystems 1018, sensors 1020, accelerometers 1022, security modules 1024, display subsystems 1026, I/O subsystem 1028, memory/storage 1030, touchscreen displays 1032, other input/output devices 1034, and power and power management subsystem 1036. In embodiments, these components may communicate over one or more communication buses or signal lines (not shown).

It shall be noted that system 1000 is only one example of an information handling system, and that system 1000 may have more or fewer components than shown, may combine two or more components, or may have a different configuration or arrangement of the components. The various components shown in FIG. 10 may be implemented in hardware, software, firmware, or a combination thereof, including one or more signal processing and/or application specific integrated circuits (ASICs).

In embodiments, the system 1000 comprises one or more processors, which may include one or more of an applications processor, a communications processor, a graphics processor, a signal processor, and an encryption processor. In embodiments, the one or more processors 1002 execute various programs and/or sets of instructions to perform various functions for system 1000 and to process data.

In embodiments, the memory/storage 1030 which may include one or more computer-readable storage mediums and a memory controller. The memory 1030 may include random access memory (RAM), read-only memory (ROM), and may also include non-transitory memory such as volatile and non-volatile memory. The memory may include one or more magnetic disk storage devices, flash memory devices, or other solid-state memory devices. Access to the memory by other components may be controlled by a memory controller.

In embodiments, software components may be stored in memory and may include an operating system and one or more applications. Examples of applications that may be stored in memory include Global Positioning System (GPS), texting, email, word processing, presentation applications, JAVA-enabled applications, encryption, digital rights management, voice recognition, face recognition, etc.

In embodiments, the memory 1030 may stores device/global internal state data and other contextual data, including information obtained from the system's various sensors and input control devices and location information concerning the system's location.

In embodiments, the operating system (e.g., Android, RTXC, LINUX, UNIX, OS X, WINDOWS, or an embedded operating system such as VxWorks) may include various software components and/or drivers for controlling and managing general system tasks and facilitates communication between various hardware and software components.

In embodiments, one or more speakers 1004, microphones 1006, cameras 1008, and the audio/vision subsystems provide audio and visual interface(s) between a user and the system 1000. Audio and/or visual data may be retrieved from and/or transmitted to memory 1030 and/or connectivity subsystem(s) 1018 via peripherals interface 1016. In embodiments, the system may include one or more ports or jacks for removable audio-visual input/output peripherals. In embodiments, the camera(s) 1008 or other optical sensors receive light and convert the light to data representing an image (still or video images).

In embodiments, the peripherals interface 1016 may be used to couple input and output peripherals of the system to the one or more processors 1002.

In embodiments, the connectivity subsystem(s) 1018 may include RF (radio frequency) circuitry to receive and/or send RF signals to facilitate communication with one or more networks and other devices. RF circuitry may include well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The connectivity subsystem(s) 1018 may communicate with networks, such as the Internet, an intranet and/or a wireless network, and other devices by wireless communication. In embodiments, the wireless communication may use any of a plurality of communications standards, protocols and technologies, including Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document. In embodiments, the connectivity subsystem(s) 1018 may facilitate communication with other devices over one or more ports 1014 and also includes various components for handling data received by RF circuitry and/or port. In embodiments, a port (e.g., Universal Serial Bus (USB), FIREWIRE, etc.) is adapted for coupling directly to other devices or indirectly over a network (e.g., the Internet, wireless LAN, etc.).

In embodiments, the I/O subsystem 1028 communicatively couples input/output peripherals on the system 1000, such as touch display 1032 and other I/O devices 1034, to the peripherals interface 1016. The I/O subsystem may include a display controller and one or more input controllers for other input or control devices. The other input control devices may include physical buttons, dials, slider switches, joysticks, click wheels, and so forth. In embodiments, the device may include or be coupled to: a keyboard, infrared port, USB port, and a mouse or other pointing device.

In embodiments, a touch-sensitive display 1032 (which may also be referred to as a touch display or a touch screen) may provide an input and output interface. For example, the display 1032 may be a user interface that presents one or more soft keys or icons to user to facilitate display to the user and input from the user. In embodiments, the system may use visual clues and/or a stylus that hovers over the system to detect an input. In embodiments, the touch screen 1032 may use LCD (liquid crystal display) technology, LPD (light emitting polymer display) technology, or LED (light emitting diode) technology, although other display technologies may be used in other embodiments. In embodiments, the touch display 1032 and display subsystem 1026 may detect contact, movement, stylus, or the like using any of a plurality of touch sensing technologies now known or later developed, including capacitive, resistive, infrared, and surface acoustic wave technologies, as well as other proximity sensor arrays or other elements. In embodiments, the system 1000 may also include a fingerprint reading touchpad.

In embodiments, a graphics processor and/or display subsystem(s) 1026 renders and displays graphics on the touch display or other displays. As used herein, the term "graphics" shall be understood to mean any object that can be displayed to a user, including without limitation text, web pages, icons (such as user-interface objects), digital images (still and/or videos), animations, and the like.

In embodiments, the system 1000 may also include one or more proximity sensors 1012, which may be communicatively coupled to the peripherals interface 1016, the I/O subsystem 1028, or both. In embodiments, the proximity sensor turns on or off elements based upon detecting the closeness of the user (e.g., disables the touch display when the system is placed near the user's face).

In embodiments, the system 1000 may also include one or more accelerometers 1022, which may be communicatively coupled to the peripherals interface 1016, the I/O subsystem 1028, or both.

In embodiments, the system 1000 also includes power and power management system 1036 for powering the various components.

In embodiments, the system 1000 may include a Global Positioning Satellite receiver or other global navigation system receiver (not shown) for obtaining information concerning the location of the system 1000.

In embodiments, the system 1000 includes a security module 1024 that performs operations as described above related to the present invention. Embodiments of security module 1024 are described in more detail with reference to FIG. 11.

Figure 11:
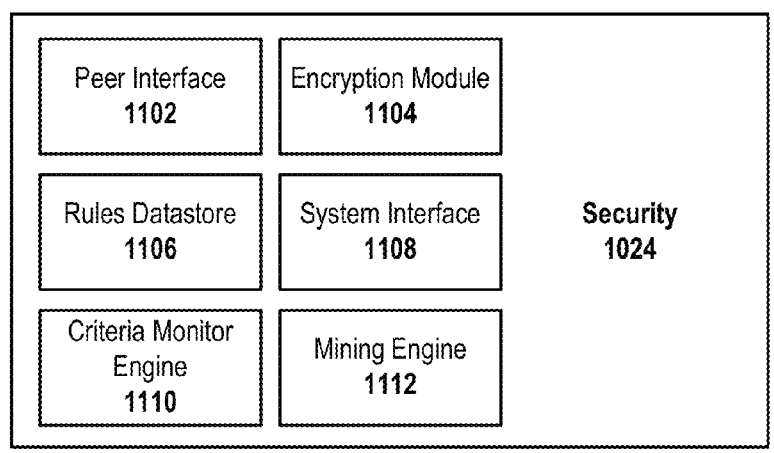
FIG. 11 depicts a simplified block diagram of a security module of a mobile information handling system according to embodiments of the present invention.

FIG. 11 depicts a simplified block diagram of a security module of a mobile information handling system according to embodiments of the present invention. In embodiments, the modules depicted in FIG. 11 operate to perform one or more of the methods described above.

In embodiments, the security module 1024 comprises a peer interface 1102, a encryption module 1104, a rules module 1106, a systems interface 1108, a criteria monitor 1110, and a mining module 1112.

In embodiments, the peer interface module 1102 is used to interface with the peer-to-peer network. In embodiments, its function is to abstract the details of the communications channel implemented by leveraging the block chain to retrieve and store data.

In embodiments, the encryption module 1104 performs encryption and decryption operations. In embodiments, its function is to ensure the integrity of the messages received and sent by the device being protected. The prerogative of the encryption module 1104 is to ensure that data the device might add to the block chain, such as it reporting its current location, can be recorded in the block chain and then extracted by an interested, and authorized, party who can interpret the data and be assured of its origin (e.g., through a digital signature). Similarly, the encryption module 1104 ensures that messages extracted from the block chain are properly decoded and their sender's identity validated.

In embodiments, the rules module 1106 stores one or more rules, such as rules related to collecting data, accessing the network, triggers or criteria for actions to be taken, and the like. In embodiments, a properly identified entity may modify the rules.

In embodiments, the system interface module 1108 is used to interface with the system components for various purposes. For example, the system interface may interface with the one or more components of the device to collect data (e.g., GPS, audio, images, usage state information, etc.), to send and receive data (including messages), to disable or enable features, to display alerts, and to erase data. In embodiments, the system interface may use existing interfaces of the system 1000. In embodiments, these interfaces provide abstract representations of the physical devices that comprise the device being protected by the present invention. In embodiments, these abstractions are important as they generalize the present invention by separating the protection function from the details of a particular hardware instance or architecture. This ensures that the present invention is applicable to protecting a broad class of information handling devices that can provide such interface abstractions.

In embodiments, the criteria monitor 1110 may optionally be present and is used to access the rules from the rules module 1106 and data via the system interface 1108 or stored in memory (not shown) to determine whether one or more triggering events have occurred based upon the rules and data. If a triggering event has occurred, the criteria monitor 1110 works with the system interface module 1108 to take the appropriate action as defined by the rules. In embodiments, these actions are designed to protect the device, the data it may contain (e.g., on a mobile phone things like contact information, photographs, videos, etc.), and, generally, to make it unusable, and so valueless, to anyone other than the owner or an authorized user.

In embodiments, the mining module 1112 may optionally be present, and if so, is used to perform mining operations related to the peer-to-peer network and the maintenance of the block chain. Because this process can be resource intensive, the computing device (e.g., system 1000) may not perform full mining functions. In embodiments, the computing device may only perform limited function. In embodiments, the computing device may only perform resource intensive operations when the computing device is plugged into a power source (which may be one of the rules in the rules module 1106). In embodiments, the device being protected may be such that it is "lightly loaded" compared to its computational capacity. An example might be a device embedded in relatively static environment such as a building or a vehicle, where it is well powered and has good network connectivity, that monitors environmental parameters (e.g., the temperature). Such a device would be a good candidate to play the role of a mining node in the peer-to-peer network.

It shall be noted that embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method to provide protection for an information handling system, the method comprising:
   gathering data, using the information handling system, about the information handling system;
   attempting to access a peer-to-peer network comprising a plurality of decentralized nodes that maintain a publicly available block chain, the block chain comprising a plurality of cryptographically linked data blocks;
   responsive to being able to access the peer-to-peer network, submitting data related to a potential security risk about the information handling system to one or more nodes in the peer-to-peer network for inclusion in a block in the block chain;
responsive to not being able to access the peer-to-peer network, determining whether a threshold number of consecutive attempts to access the peer-to-peer network has been exceeded; and
responsive to the threshold number of consecutive attempts to access the peer-to-peer network having been exceeded, taking one or more actions related to securing the information handling system.

2. The computer-implemented method of claim 1 wherein the information handling system is a mobile device.

3. The computer-implemented method of claim 1 wherein the submitted data related to a potential security risk about the information handling system comprises:
at least some of the data gathered about the information handling system; and
a request for a node to analyze the data to identify whether a security risk exists for the information handling system.

4. The computer-implemented method of claim 3 further comprising:
receiving an updated block chain from one or more node of the peer-to-peer network;
analyzing at least part of the updated block chain to identify a message directed to the information handling system; and
responsive to identify a message in a block of the updated block chain that is directed to the information handling system, taking one or more actions related to the message.

5. The computer-implemented method of claim 4 wherein the message is a response from a node in the peer-to-peer network that has analyzed the submitted data.

6. The computer-implemented method of claim 4 wherein the message identifies a security risk and the one or more actions comprises at least one of:
disabling access to, operation of, or both of one or more functions of the information handing system;
presenting one or more notifications to a user of the information handling system that access to, operation of, or both of one or more user functions of the information handing system have been disabled; and
sending an alert to at least one of an owner of the system and a security organization.

7. The computer-implemented method of claim 1 wherein the step of submitting data related to a potential security risk about the information handling system to one or more nodes in the peer-to-peer network for inclusion in a block in the block chain comprises the steps of:
encrypting at least some of the data gathered about the information handling system; and
submitted the encrypted data as the submitted data related to a potential security risk about the information handling system, wherein the submitted encrypted data may be accessed by an authorized entity to track the information handling system.

8. The computer-implemented method of claim 1 further comprising:
wherein at least some of the gathered data is analyzed by the information handling system to identify whether a security risk or risks exist for the information handling system according to one or more rules; and
responsive identifying one or more security risks, generating a message alerting of the security risk, wherein the submitted data comprises the message alerting of the security risk.

9. The computer-implemented method of claim 1 further comprising:
responsive to the threshold number of consecutive attempts to access the peer-to-peer network not having been exceeded:
waiting until a condition has been met; and
retrying to access the peer-to-peer network.

10. The computer-implemented method of claim 1 wherein the step of taking one or more actions related to securing the information handling system comprises:
disabling access to, operation of, or both of one or more functions of the information handing system;
presenting one or more notifications to a user of the information handling system that access to, operation of, or both of one or more user functions of the information handing system have been disabled; and
sending an alert to at least one of an owner of the system and a security organization.

11. A computing device comprising:
one or more processors;
one or more memory components communicatively coupled to the processor;
one or more network interfaces, communicatively coupled to the processor, that provides access to one or more networks;
one or more sensors for capturing sensor data related to the computing device; and
a security subsystem that provides one or more security-related services, the security subsystem comprising:
a peer interface, communicatively coupled to the network interface, that interfaces with one or more decentralized nodes of a peer-to-peer network, the peer-to-peer network comprising a plurality of nodes that maintain a cryptographically secure and public block chain;
a rules database that comprises a set of rules related to security of the device, the set of rules comprising:
responsive to not being able to access the peer-to-peer network, determining whether a threshold number of consecutive attempts to access the peer-to-peer network has been exceeded; and
responsive to the threshold number of consecutive attempts to access the peer-to-peer network having been exceeded, taking one or more actions related to securing the computing device;
a system interface module that interfaces with the one or more system components to gather data related to security of the device and that, responsive to a perceived security risk, disables access to, operation of, or both of one or more functions of the device; and
a criteria monitor engine, communicatively coupled to the rules module, that analyzes at some of the gathered data based upon one or more rules in the rules database to detect a security issue.

12. The computing device of claim 11 further comprising:
an encryption module that encrypts at least some data submitted to one or more decentralized nodes of the peer-to-peer network, wherein the submitted data is intended for inclusion in a block in the block chain.

13. The computing device of claim 11 wherein:
the peer interface is further configured to receive at least a portion of the block chain from one or more nodes of the peer-to-peer network; and
the criteria monitor engine is further configured to cause a specified action or actions to be taken responsive to one or more instructions identified in a message directed to the computing device in a block of the block chain.

14. The computing device of claim 11 wherein the rule database comprising one or more rules comprising:
responsive to the threshold number of consecutive attempts to access the peer-to-peer network not having been exceeded:
waiting until a condition has been met; and
retrying to access the peer-to-peer network.

15. The computing device of claim 11 wherein the system interface module is configured to cause the step of taking one or more actions related to securing the computing device by causing one or more of the following steps comprises:
disabling access to, operation of, or both of one or more functions of the computing device;
presenting one or more notifications to a user of the computing device that access to, operation of, or both of one or more user functions of the computing device have been disabled; and
sending an alert to at least one of an owner of the system and a security organization.

16. A computer-implemented method to provide protection for an information handling system, the method comprising:
attempting to access a peer-to-peer network that maintains a secure distributed transactional ledger, the secure distributed transactional ledger comprising a cryptographically linked sets of data blocks;
responsive to being able to access the peer-to-peer network:
obtaining at least part of the secure distributed transactional ledger;
examining one or more of the data blocks for a message directed to the information handling system;
responsive to identify a message directed to the information handling system, verifying whether the message was sent by an authorized entity; and
responsive to the message being from a verified authorized entity, taking one or more actions related to the message; and
responsive to not being able to access the peer-to-peer network, determining whether a threshold number of consecutive attempts to access the peer-to-peer network has been exceeded; and
responsive to the threshold number of consecutive attempts to access the peer-to-peer network having been exceeded, taking one or more actions related to securing the information handling system.

17. The computer-implemented method of claim 16 further comprising:
receiving, via a secure distributed transactional ledger, a message comprising one or more rules related to protecting or reporting data about the information handling system.

18. The computer-implemented method of claim 16 further comprising:
gathering data, using the information handling system, about the information handling system; and
submitting at least some of the gathered data to the peer-to-peer network for permanent inclusion into the secure distributed transactional ledger.

19. The computer-implemented method of claim 16 further comprising:
responsive to the threshold number of consecutive attempts to access the peer-to-peer network not having been exceeded:
waiting until a condition has been met; and
retrying to access the peer-to-peer network.

20. The computer-implemented method of claim 16 wherein the step of taking one or more actions related to securing the information handling system comprises at least one of:
disabling access to, operation of, or both of one or more user functions of the information handing system;
presenting one or more notifications to a user of the information handling system that access to, operation of, or both of one or more user functions of the information handling system have been disabled; and
sending an alert message to at least one of an owner of the system and a security organization.

* * * * *